United States Patent
Gier et al.

(10) Patent No.: US 11,572,299 B2
(45) Date of Patent: Feb. 7, 2023

(54) DEVICE AND METHOD FOR PICKING UP, SHAPING, AND PLACING A THIN GLASS PANE

(71) Applicant: SAINT-GOBAIN GLASS FRANCE, Courbevoie (FR)

(72) Inventors: Stephan Gier, Bous (DE); Nikolai Borchmann, Herzogenrath (DE); Stefan Lücke, Spenge (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 610 days.

(21) Appl. No.: 16/496,014

(22) PCT Filed: Feb. 27, 2018

(86) PCT No.: PCT/EP2018/054783
§ 371 (c)(1),
(2) Date: Sep. 20, 2019

(87) PCT Pub. No.: WO2018/172022
PCT Pub. Date: Sep. 27, 2018

(65) Prior Publication Data
US 2020/0109076 A1    Apr. 9, 2020

(30) Foreign Application Priority Data
Mar. 22, 2017   (EP) .................... 17162208

(51) Int. Cl.
*C03B 9/36*        (2006.01)
*C03B 9/38*        (2006.01)
(Continued)

(52) U.S. Cl.
CPC ........ *C03B 23/0256* (2013.01); *B25B 11/005* (2013.01); *B25J 15/0616* (2013.01);
(Continued)

(58) Field of Classification Search
CPC ... C03B 23/0256; C03B 23/023; C03B 23/02; B65G 49/061
(Continued)

(56) References Cited

U.S. PATENT DOCUMENTS 3,046,169 A * 7/1962 Richardson ....... B32B 17/10862
100/255
3,826,485 A * 7/1974 Shindo ................. B65H 3/0816
271/106
(Continued)

FOREIGN PATENT DOCUMENTS

BE        902515 A * 11/1985 ........... B25B 11/005
CN       1186763 A      7/1998
(Continued)

OTHER PUBLICATIONS

International Search Report as issued in International Patent Application No. PCT/EP2018/054783, dated Apr. 30, 2018.

*Primary Examiner* — Alison L Hindenlang
*Assistant Examiner* — Steven S Lee
(74) *Attorney, Agent, or Firm* — Pillsbury Winthrop Shaw Pittman LLP

(57) ABSTRACT

A device for picking up, shaping, and placing a thin glass pane, includes a frame with an upper side and a lower side, which is suitable to be directed at a glass pane with a thickness of less than 1 mm, and which is provided with a plurality of picking up pins that are arranged substantially parallel to one another and whose end directed at the glass pane is equipped with a suction cup, wherein the picking up pins are movable along their direction of extension independent of one another in order to adapt the arrangement of the suction cups to an intended shape of the glass pane.

14 Claims, 6 Drawing Sheets

(a)

(b)

Figure 1:
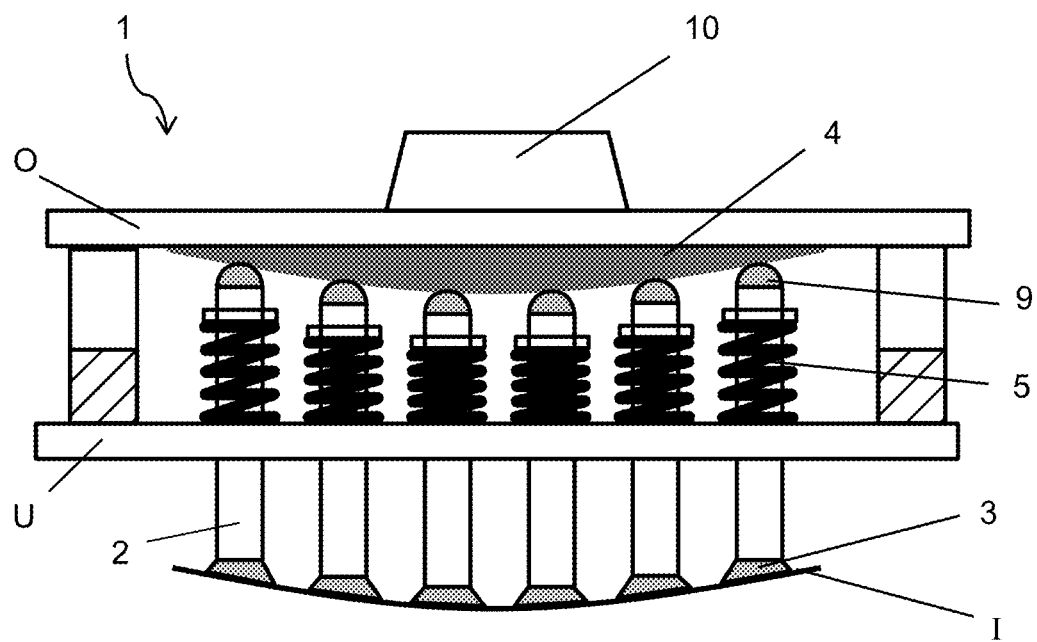

(51) Int. Cl.
  *C03B 17/04* (2006.01)
  *B25B 11/00* (2006.01)
  *B25J 15/06* (2006.01)
  *B65G 49/06* (2006.01)
  *C03B 23/023* (2006.01)
  *C03B 35/14* (2006.01)
  *B32B 17/10* (2006.01)
  *B32B 38/18* (2006.01)
  *C03B 23/025* (2006.01)

(52) U.S. Cl.
  CPC .. *B32B 17/10036* (2013.01); *B32B 17/10761* (2013.01); *B32B 17/10871* (2013.01); *B32B 17/10889* (2013.01); *B32B 38/1858* (2013.01); *B32B 38/1866* (2013.01); *B65G 49/061* (2013.01); *C03B 23/0235* (2013.01); *C03B 35/145* (2013.01); *B32B 2309/105* (2013.01); *C03B 23/023* (2013.01)

(58) Field of Classification Search
  USPC .............................................................. 65/68
  See application file for complete search history.

(56) References Cited

U.S. PATENT DOCUMENTS

| | | | | |
|---|---|---|---|---|
| 3,881,906 | A * | 5/1975 | Ritter, Jr. | C03B 23/0252 65/106 |
| 4,129,328 | A * | 12/1978 | Littell | B25J 15/0061 294/65 |
| 4,822,398 | A * | 4/1989 | McMaster | C03B 27/0447 65/273 |
| 5,173,148 | A * | 12/1992 | Lisec | B65G 49/061 269/21 |
| 5,401,286 | A * | 3/1995 | Goolsbay | C03B 23/0305 65/273 |
| 5,695,538 | A * | 12/1997 | Goolsbay | C03B 23/0305 65/273 |
| 6,413,347 | B1 * | 7/2002 | Hosaka | B29C 65/7847 428/81 |
| 6,431,623 | B1 * | 8/2002 | Roeters | B65G 47/918 294/185 |
| 6,543,255 | B2 * | 4/2003 | Bennett | C03B 35/202 65/106 |
| 7,070,863 | B2 | 7/2006 | Meerman | |
| 9,555,550 | B2 * | 1/2017 | Eisele | B29C 70/54 |
| 2013/0136565 | A1 * | 5/2013 | Amsden | B66C 1/0237 414/800 |
| 2013/0241128 | A1 * | 9/2013 | Eda | B32B 38/1866 269/21 |
| 2014/0199153 | A1 * | 7/2014 | Reinhold | B25J 15/0616 414/800 |
| 2016/0167894 | A1 | 6/2016 | Morris et al. | |
| 2016/0297169 | A1 | 10/2016 | Notsu et al. | |

FOREIGN PATENT DOCUMENTS

| | | | |
|---|---|---|---|
| CN | 1764607 A | | 4/2006 |
| DE | 3 919 290 A1 | | 12/1989 |
| DE | 10 2006 017763 A1 | | 10/2007 |
| DE | 10 2007 031760 A1 | | 1/2009 |
| EA | 010208 B1 | | 6/2008 |
| EP | 1 358 131 A1 | | 11/2003 |
| EP | 1 836 136 A1 | | 9/2007 |
| EP | 2 421 704 A1 | | 2/2012 |
| EP | 2 463 247 A1 | | 6/2012 |
| EP | 2 463 248 A1 | | 6/2012 |
| EP | 3 078 488 A1 | | 10/2016 |
| JP | H04-214051 A | | 8/1992 |
| JP | H07-187692 A | | 7/1995 |
| JP | 2006-321575 A | | 11/2006 |
| JP | 2006321575 A * | | 11/2006 |
| JP | 4078499 B2 * | 4/2008 | ......... B29C 45/0053 |
| JP | 2014-527011 A | | 10/2014 |
| JP | 2016-199457 A | | 12/2016 |
| RU | 2689097 C1 | | 5/2019 |
| SU | 1025639 A | | 6/1983 |
| SU | 1281497 A1 | | 1/1987 |
| SU | 1373667 A1 | | 2/1988 |
| WO | WO 02/064519 A1 | | 8/2002 |
| WO | WO 2006/072721 A1 | | 7/2006 |
| WO | WO 2010/121986 A1 | | 10/2010 |
| WO | WO 2012/090633 A1 | | 7/2012 |
| WO | WO 2015/058885 A1 | | 4/2015 |
| WO | WO 2015/158464 A1 | | 10/2015 |
| WO | WO 2016/091435 A1 | | 6/2016 |
| WO | WO-2016141041 A1 * | 9/2016 | ......... C03B 23/0252 |
| WO | WO-2017005770 A1 * | 1/2017 | ......... B25J 15/0616 |
| WO | WO 2017/089070 A1 | | 6/2017 |

* cited by examiner (a)
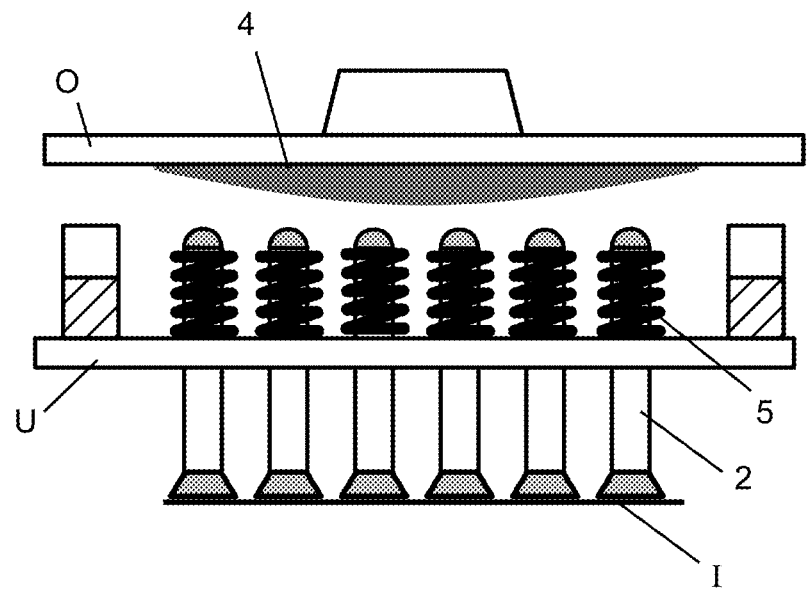
(b)
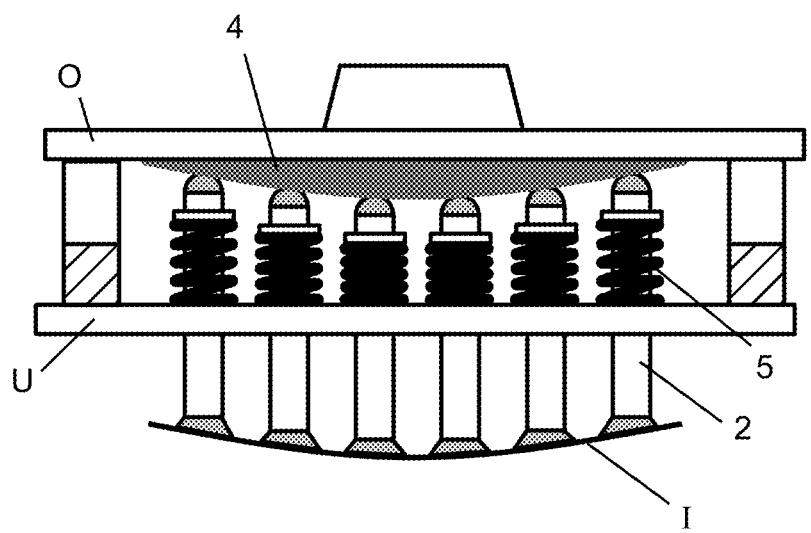
Fig. 6

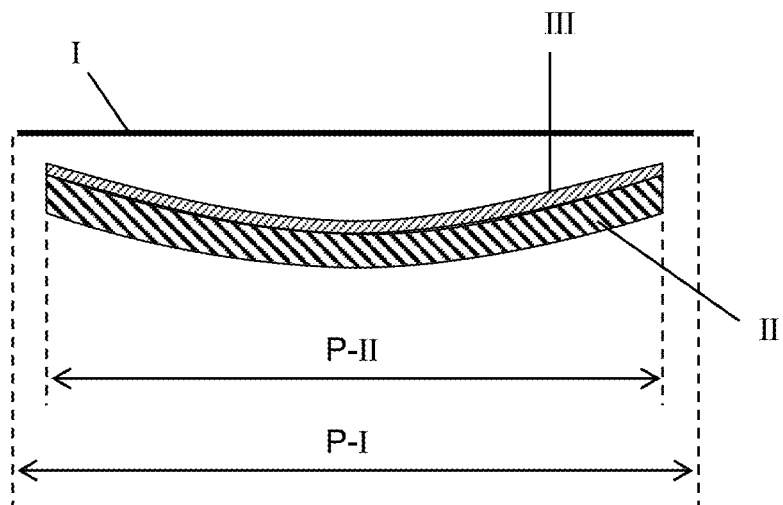
Fig. 7 – Prior Art
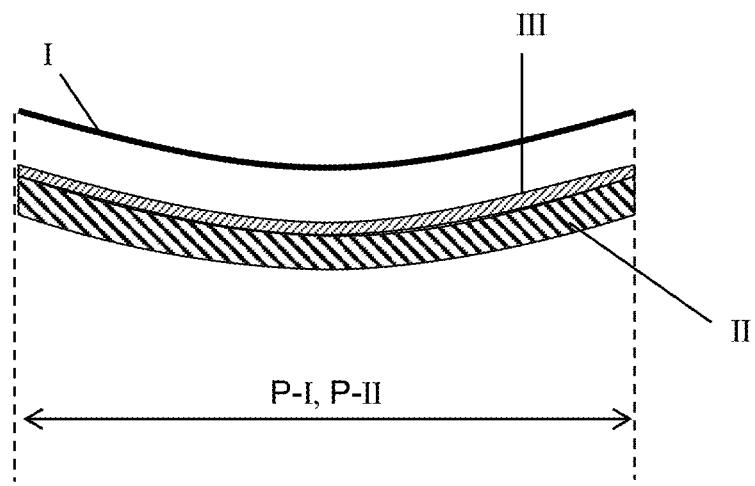
Fig. 8

Positioning the picking up pins 2 of a device according to the invention such that the suction cups 3 span a planar surface

Contacting a planar glass pane I (aluminosilicate glass, 0.7 mm) with the suction cups 3

Raising the glass pane I adhering to the suction cups

Moving the picking up pins 2 into the final position, wherein the glass pane I is bent into the final shape

Flush placement of the glass pane I on a congruent, pre-bent second glass pane II (soda lime glass, 2.1 mm) with an interposed thermoplastic film III (PVB, 0.76 mm)

Fig. 9

Moving the picking up pins 2 of a device according to the invention into the final position such that the suction cups 3 span a bent surface

Contacting a planar glass pane I (aluminosilicate glass, 0.7 mm) with the suction cups 3 located at the edge

Rolling movement of the device over the glass pane I such that an increasing number of picking up pins 2 come into contact with the glass pane I and the already adhering regions of the glass pane I are raised and bent

Flush placement of the glass pane I on a congruent, pre-bent second glass pane II (soda lime glass, 2.1 mm) with an interposed thermoplastic film III (PVB, 0.76 mm)

Fig. 10

DEVICE AND METHOD FOR PICKING UP, SHAPING, AND PLACING A THIN GLASS PANE

CROSS REFERENCE TO RELATED APPLICATIONS

This application is the U.S. National Stage of PCT/EP2018/054783, filed Feb. 27, 2018, which in turn claims priority to European Patent Application No. 17162208.7 filed Mar. 22, 2017, the entire contents of all applications are incorporated herein by reference in their entireties.

The invention relates to a device and a method for picking up, shaping, and placing a thin glass pane, in particular for precise placement on a pre-bent thicker glass pane.

Composite glass panes are common as motor vehicle glazings, in particular as windshields or roof panels, but are also increasingly used as side windows or rear windows. They are made of two glass panes, which are joined to one another via a thermoplastic intermediate layer. Typical thicknesses of the glass panes in conventional composite glass panes are approx. 2 mm. Glazings in the automotive sector are frequently curved. The relatively thick individual glass panes of conventional composite glass panes are first heated to softening temperature and bent. After solidification, they have a dimensionally stable curvature and are then laminated to form the composite glass pane. In order to optimally match the shape of the two glass panes to be joined, they can be simultaneously bent congruently in pairs positioned one atop the other. Such bending methods are, for example, known from EP 1 836 136 A1, EP 1 358 131 A1, EP 2 463 247 A1, and EP 2 463 248 A1.

In order to reduce the weight of the glazings, there are efforts to reduce the thickness of the individual glass panes, whereby, nevertheless, the requirements for stability and break resistance of vehicle window panes must be met. Thus, composite glass panes that have a thin glass pane having a thickness less than 1.5 mm or even less than 1 mm are increasingly proposed. Merely by way of example, reference is made to EP 2 421 704 A1, U.S. Pat. No. 7,070,863 B2, DE 3 919 290 A1, WO 2015/058885 A1, WO 2015/158464 A1, and WO 2016/091435 A1. To increase stability, the thin glass panes can be chemically tempered.

Conventional bending of the thin glass panes is frequently difficult. On the one hand, the thin glass panes are susceptible to breakage during handling; on the other, they often have chemical compositions with high softening temperatures, making bending energy-intensive. If a thin and a thick glass pane are to be laminated to one another, they also usually have different compositions, with the common, inexpensive soda lime glass used for the thick glass pane and, in contrast, a glass composition for the thin glass pane is selected in terms of suitability for chemical tempering. The associated different softening temperatures of the two panes make bending in pairs difficult or impossible.

Thin glass panes are, however, already so flexible at room temperature that prior bending into a dimensionally stable shape can be dispensed with. But difficulties arise in the exact positioning of the thin glass onto the pre-bent thicker glass pane. Pre-bending reduces the projection area of the thicker glass pane compared to the planar thin glass pane. When the planar glass pane is placed on the pre-bent thick glass pane, it protrudes circumferentially beyond the side edges of the thick glass pane. During the subsequent shaping of the thin glass pane, the side edges of the two glass panes should ideally be exactly aligned on one another. This is, however, difficult to accomplish with automation because, due to the different projection areas, a robot arm cannot determine the ideal position for the thin glass pane with sufficient accuracy. Since, in the initial state, the side edges of the glass panes are not yet positioned atop one another, optimum precision cannot be obtained with otherwise common positioning aids, such as mechanical sensors.

Thus, there is a demand for improved devices and methods for the exact positioning of a thin glass pane on a thicker glass pane, wherein the thin and the thicker glass pane have, in the initial state, different curvatures and, consequently, different projection areas. The object of the present invention is to provide such a device and such a method.

The object is accomplished according to the invention by a device for picking up, shaping, and placing a thin glass pane, comprising a frame with an upper side and a lower side, wherein the lower side is intended and is suitable to be directed at a glass pane and is provided with a plurality of picking up pins that are arranged substantially parallel to one another and whose end directed at the glass pane is equipped with a suction cup, wherein the picking up pins are movable along their direction of extension independent of one another in order to adapt the arrangement of the suction cups to an intended shape of the glass pane.

The object is also accomplished by a method for picking up, shaping, and placing a thin glass pane, wherein a glass pane is brought into contact with the suction cups of a device according to the invention and is raised and wherein the picking up pins are moved such that the arrangement of the suction cups is adapted to an intended shape of the glass pane in order to shape the glass pane. The glass pane adhering to the suction cups is bent into the intended shape.

The device and the method are presented together in the following with the explanations and preferred embodiments referring equally to the device and to the method.

The intended shape of the glass pane is that curved shape that the glass pane is supposed to have at the end of the process. It can also be referred to as the desired shape, the shape to be obtained, or the final shape and is characterized by the local distribution of the radii of curvature. It corresponds in particular (at least approx.) to the curved shape of the pre-bent thicker glass pane onto which the thin glass pane is to be placed.

The glass pane is a thin glass pane, meaning, in the context of the invention, a glass pane with a thickness of less than 1 mm. The thickness of the glass pane is preferably less than 0.8 mm. The thickness of the glass pane can, for example, be from 0.2 mm to 1.0 mm or from 0.4 mm to 0.7 mm. Glass panes with these thicknesses can be readily shaped without prior heating to softening temperature. The thin glass pane can be hardened or tempered to increase its break resistance, making handling easier. Since glass panes with these low thicknesses can be thermally tempered only with difficulty or not at all, the first glass pane is preferably chemically tempered. The glass pane is preferably made of a type of glass that can readily be chemically tempered. Consequently, the first glass pane is preferably made of aluminosilicate glass, in particular of alkali-aluminosilicate glass. The chemical tempering is done by exchanging smaller alkali ions for larger alkali anions (for example, sodium ions for potassium ions), as a result of which depth-dependent compressive stresses are produced. Moreover, this type of glass is distinguished by high scratch resistance and hardness.

The glass pane is preferably planar in the initial state before it is picked up by the device according to the invention. However, in principle, the glass pane can also be pre-bent, wherein it has a smaller curvature than the intended shape, i.e., in particular, than the thicker glass pane on which it is to be placed.

The device according to the invention shapes the glass pane before it is again placed. The glass pane is bent into the intended shape. Thus, it is accomplished that the thin glass pane and the thicker glass pane with which it is to be joined already have the same geometry and, thus, the same projection area before they are placed one atop the other. The side edges of the two glass panes can be precisely aligned on one another and it is possible to produce composite glasses with improved edge flushness, which are subjected to lower manufacturing tolerances in the production process. This is the major advantage of the present invention.

The device according to the invention includes a frame. The frame has a lower side and an upper side. The lower side can also be referred to as the lower part or the lower region of the frame; and the upper side, as the upper part or the upper region. The lower side is intended to be directed onto the glass pane and is provided with the picking up pins according to the invention. To that end, the lower side preferably has a full-surface cover that is provided with boreholes or passages through which the picking up pins are guided. The picking up pins thus extend through the cover of the lower side and are arranged substantially perpendicular thereto, with one end of the picking up pins intended to and suitable to be directed onto the glass pane and the other end of the picking up pins pointing toward the upper side of the frame.

The frame is attached to a robot arm in an advantageous embodiment. The robot arm is preferably attached to the upper side of the frame. The robot arm can move the frame at least vertically upward and downward in order to raise and place the glass pane and can preferably also move the frame sideways in order to move the picked-up thin glass pane over the thicker glass pane. Optionally, the robot arm can, moreover, also execute rotational or tilting movements. To this end, the robot arm is equipped with appropriate means well known per se to the person skilled in the art.

Alternatively, it is, however, also possible to operate the device according to the invention manually, either completely free handed or, for example, attached to a suspension means.

The picking up pins, which can also be referred to as bolts or cylinders, are arranged substantially parallel to one another and distributed over the lower side of the frame. They are movable, independent of one another, along their direction of extension. Each picking up pin can thus be moved out of and into the frame. As a result of the independent movability, the picking up pins can be oriented such that their suction cups can span a surface that corresponds to the intended curved geometry of the glass pane in the final state. The same device can be used for processing various glass pane types because, in principle, any pane geometry can be replicated with the independently movable picking up pins. It is not necessary for all the picking up pins of a device to be used in the processing of a specific type of pane. Instead, a device can be implemented, so to speak, as a universal tool with an adequate number of picking up pins and an adequately large active area in order to be able to process even the largest and most complex types of panes, wherein in the processing of smaller and/or less complexly curved panes, only some of the picking up pins are used.

The picking up pins can be distributed over the entire area of the glass pane. It can also suffice, depending on the pane type, for the picking up pins to engage only in a frame-like manner in the peripheral edge region of the glass pane.

The number and the distance between the picking up pins can be suitably selected by the person skilled in the art according to the complexity of the pane bending. Thus, with panes with relatively simple bending, few picking up pins are sufficient, whereas more complex bends with small local radii of curvature and a plurality of differently curved regions can be realized by a larger number of picking up pins. Preferably, the device should have at least 3 picking up pins. The distance between adjacent picking up pins is preferably from 50 mm to 200 mm. The picking up pins preferably have a diameter of at least 5 mm, for example, of 8 mm to 15 mm.

The contact with the glass pane is established with the suction cups at the ends of the picking up pins. The suction cups typically have an active area of $0.7$ cm$^2$ to $30$ cm$^2$ and are made, for example, of rubber. In an advantageous embodiment, the glass pane is sucked onto the suction cups by means of a negative pressure. For this, the device is equipped with a means for generating a negative pressure, for example, a vacuum pump or Venturi nozzles, that is connected to the suction cups via supply lines. In a particularly advantageous embodiment, the supply lines run through the interior of the picking up pins, which are, for this purpose, preferably hollow. The supply line, which is implemented, for example, by means of a hose, can, for example, be routed laterally out of the picking up pin in the upper region thereof. It is, however, also possible to route the supply line to the suction cup outside the picking up pin.

The movement of the picking up pins can be realized in various ways. In a first advantageous embodiment, the picking up pins are provided with springs. The springs are preferably arranged in the interior of the frame on the lower side and connected to the part of the picking up pins situated in the interior of the frame such that the picking up pins are pressed into the frame by spring force, i.e., upward. One spring is associated with each picking up pin. For this, the springs can, for example, engage on a collar at or near the end of the picking up pins facing away from the glass pane. The device also includes a model mold in the interior of the frame. The intended arrangement of the suction cups adapted to the final shape of the glass pane is achieved in that ends of the picking up pins facing away from the glass pane are in contact in the interior of the frame with the model mold, as a result of which the picking up pins are pressed (deflected) against the spring force of the springs downward out of the frame and held. The picking up pins are thus moved by the model mold and assume the intended arrangement without the movement having to be controlled externally, for example, by means of software.

The surface of the model mold is preferably curved. In an advantageous embodiment, the curved shape of the model mold corresponds substantially to the intended shape of the glass pane and all the picking up pins have substantially the same length. The curved shape of the model mold is thus, so to speak, copied onto the surface spanned by the suction cups. Through use of the suitable model mold, the device is universally usable for all pane types.

The ends of the picking up pins facing the model mold and facing away from the glass pane are preferably rounded, in particular substantially spherical in order to establish only spot contact with the model mold. The contact is particularly gentle when the ends facing the model mold are equipped with rollers, in particular, ball rollers.

In a first preferred variant of the first embodiment, the model mold is a hollow or solid mold that is attached to the upper side of the frame. The model mold can, for example, be made of steel, aluminum, other metals, or even of wood or plastic. The frame can preferably be opened to exchange the model mold. For this, the upper part and the lower part of the frame can be moved relative to one another such that the distance between them can be enlarged in order to release the picking up pins from the model mold and to make the model mold accessible.

Shane

In a second preferred variant of the first embodiment, the model mold is a pane, in particular a glass pane. The model mold can, for example, be a single bent glass pane or a glass laminate. The glass pane preferably has a thickness of at least 1.5 mm. The glass pane has in particular the intended shape of the thin glass pane to be processed. The glass pane is preferably clamped between the picking up pins and a plurality of retaining pins that are arranged on the upper side of the frame and also provided with springs. The springs are preferably arranged in the interior of the frame on the upper side and are connected to the part of the retaining pins situated in the interior of the frame such that the retaining pins are pressed by spring force into the frame, i.e., downward. The retaining pins are in contact with the primary surface of the model mold pane facing the upper part of the frame; the picking up pins, with the primary surface facing the lower part. The curved shape of the primary surface facing the lower part is, so to speak, copied onto the surface spanned by the suction cups.

The frame can be opened in order to change the model mold, as described in conjunction with the first variant of the first embodiment. Alternatively, the frame can be implemented with at least one side opening through which the model mold can be removed or inserted. The ends of the picking up pins and of the retaining pins facing the model mold are preferably equipped with rollers, in particular ball rollers, in order to gently pull the model mold out or push it in.

In a second advantageous embodiment, the picking up pins are equipped with motors, by means of which they can be moved along their direction of extension. The motors are, for example, attached in the interior of the frame on the lower side and can displace the picking up pins, which are preferably equipped for that purpose with threads or a linear drive. Each picking up pin is associated with a motor. The movement of the picking up pins by the motors is preferably controlled by software, into which the intended shape of the pane can be entered in order to move the picking up pins accordingly.

In all embodiments of the device, the surface spanned by the suction cups is, in the final arrangement of the picking up pins, preferably convex, viewed in the direction toward the lower side of the frame. Consequently, the surface of the model mold, if one is used, contacted by the picking up pins is also convex. In principle, however, said surfaces can also be convex or have concave and convex regions. The high flexibility with regard to the intended geometry is a major advantage of the invention.

Various embodiments of the method according to the invention are conceivable. In a first advantageous embodiment, the glass pane is first picked up with the suction cups of the picking up pins and the picking up pins are subsequently moved, shaping the glass pane. In the initial state, the glass pane is preferably planar or has a curvature that is, however, less pronounced than the intended final curvature. The glass pane is then brought into contact with the suction cups. The arrangement of the picking up pins is adapted to the initial shape of the glass pane and the suction cups preferably span a planar surface. The glass pane is then raised and the picking up pins are subsequently moved into the final position, wherein the glass pane is bent into the intended shape. The glass pane is then placed, in the bent state.

The movement of the picking up pins into the intended position after the picking up of the pane can be carried out both with the first and also with the second advantageous embodiment of the device according to the invention. In the case of the first advantageous embodiment with the model mold, the thin glass pane can be picked up in the opened state of the frame. In the opened state, the picking up pins do not touch the model mold and are, consequently, in the initial state, in which the suction cups span a planar surface. When the glass pane has been picked up, the mold is closed, as a result of which the model mold deflects the picking up pins and the glass pane is shaped accordingly. In the case of the second advantageous embodiment, the picking up pins are equipped with motors, which are activated after the picking up of the pane in order to move the picking up pins.

In a second advantageous embodiment, the picking up pins are first moved into the final position such that the arrangement of the suction cups is adapted to the final shape of the glass pane. The thin glass pane is picked up with the picking up pins in the final position and shaped while being picked up and bent into the intended shape. The frame preferably executes a rolling movement, wherein the glass pane is successively brought into contact with an increasing number of picking up pins. The rolling movement preferably starts from one side edge of the thin glass pane, in particular that side edge whose exact alignment is most critical during placement. The frame is rotated by means of the robot arm such that during lowering, those picking up pins at the shortest distance from said side edge come into contact with the pane. The frame then executes a rotational movement such that picking up pins from said side edge are lowered onto the glass pane. The regions of the glass pane already provided with suction cups with a shorter distance from said side edge are raised from the support and shaped. In the case of the second embodiment, the device has to be adjusted only once before the start of a production series. Then, the picking up pins no longer have to be moved. If the frame is attached to a robot arm, the arm is enabled for a rotational movement in order to execute the rolling movement of the frame.

At the time of the placing of the glass pane, it must be separated from the suction cups. This can, for example, be done manually or by automated ventilation of the suction cups. In a preferred embodiment, the pane surface is subjected to a flow of gas, in particular compressed air, and thus released from the suction cups. Consequently, the device is preferably equipped with means for generating a flow of gas and with nozzles arranged at the lower side of the frame to direct the flow of gas onto the glass pane and thus to press the glass pane away from the frame.

In a preferred embodiment, the glass pane is placed on a thermoplastic film, which is, in turn, arranged on a second glass pane. Thus, with high precision, a layer stack of two glass panes and an interposed thermoplastic film can be produced, which stack can, for example, subsequently be processed to form a composite glass. The two glass panes are arranged congruently flat one atop the other. The thermoplastic film is preferably also trimmed to the shape and size of the glass panes and is also arranged flat and congruent with the glass panes. It is, however, also possible to use a thermoplastic film that is larger than the glass panes and protrudes beyond them, and subsequently to circumferentially cut off the protruding parts of the film.

The second glass pane preferably has a greater thickness than the thin glass pane, which is moved and shaped with the device according to the invention. The thickness of the second glass pane is at least 1.5 mm, for example, from 1.5 mm to 5 mm. The second glass pane preferably already has the intended shape, which is obtained by conventional glass bending methods, such as gravity bending or press bending. The second glass pane is preferably made of soda lime glass, which is common as window glass, and, consequently, widely available and relatively economical. In principle, however, the second glass pane can also be made of other types of glass.

The thermoplastic film preferably includes polyvinyl butyral (PVB), ethylene vinyl acetate (EVA), or polyurethane (PU), particularly preferably PVB. It preferably has a thickness of 0.2 mm to 2 mm, in particular 0.5 mm to 1.6 mm.

In contrast to a conventional glass bending process, the shaping of the glass pane is done by means of the device according to the invention below its softening temperature. The glass pane is, consequently, not permanently bent, but, rather merely reshaped elastically, regaining its original shape after placement without the shaping influence of the picking up pins. The elastic spring back of the thin glass pane can, for example, be prevented by complete or partial lamination with the second glass pane via the thermoplastic intermediate layer. Preferably, the layer stack is spot heated in order to locally melt the thermoplastic film, as a result of which the glass panes adhere locally to the thermoplastic film. This is accomplished with heating means, such as heating coils, hot pins, hot air blowers, or laser radiation. Preferably, at least three, particularly preferably at least five locations are spot heated, by which means the shape of the thin glass pane can be stabilized.

The device according to the invention can be used in an automated production line, in which said layer stack is produced. The production line preferably includes three conveyor belts, wherein the thicker glass pane, trimmed-to-size and pre-bent into the final shape, is transported with the first conveyor belt; the congruently trimmed-to-size thermoplastic film, with the second conveyor belt; and the congruently trimmed-to-size but planar (or pre-bent to a lesser extent) thin glass pane, with the third conveyor belt to an assembly station. There, the glass panes and the intermediate film can preferably first be positioned exactly on their conveyor belts, preferably with mechanical sensors, that act in particular on at least two edges of the glass panes or the intermediate film. The intermediate film is then placed on the thicker glass by means of a robot, and the thin glass pane is placed on the intermediate film by means of a robot equipped with the device according to the invention. The resultant layer stack is then transported out of the assembly station by means of a conveyor belt that is preferably a continuation of said first conveyor belt.

The production line can, alternatively, also have only two transport belts for the two glass panes, wherein the trimmed-to-size thermoplastic film is manually placed in the assembly station.

The invention also includes the use of a device according to the invention for picking up, shaping, and placing a glass pane with a thickness of less than 1 mm.

Figure 2:
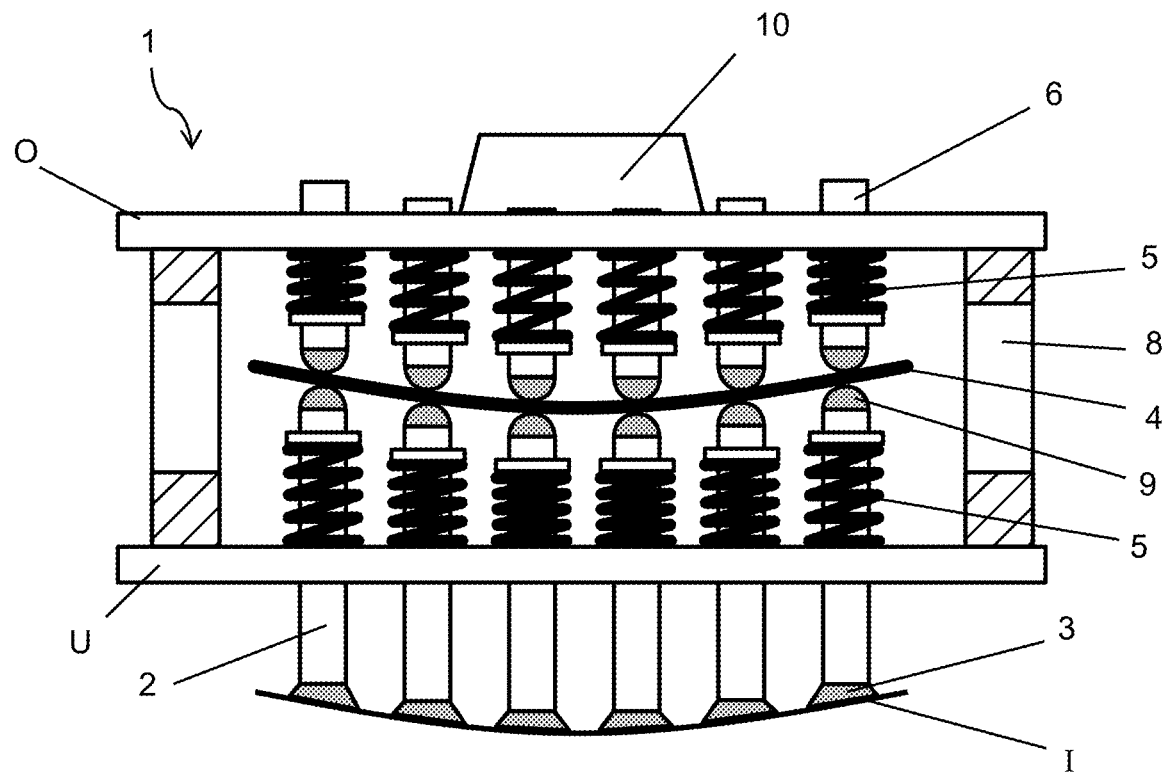
Figure 3:
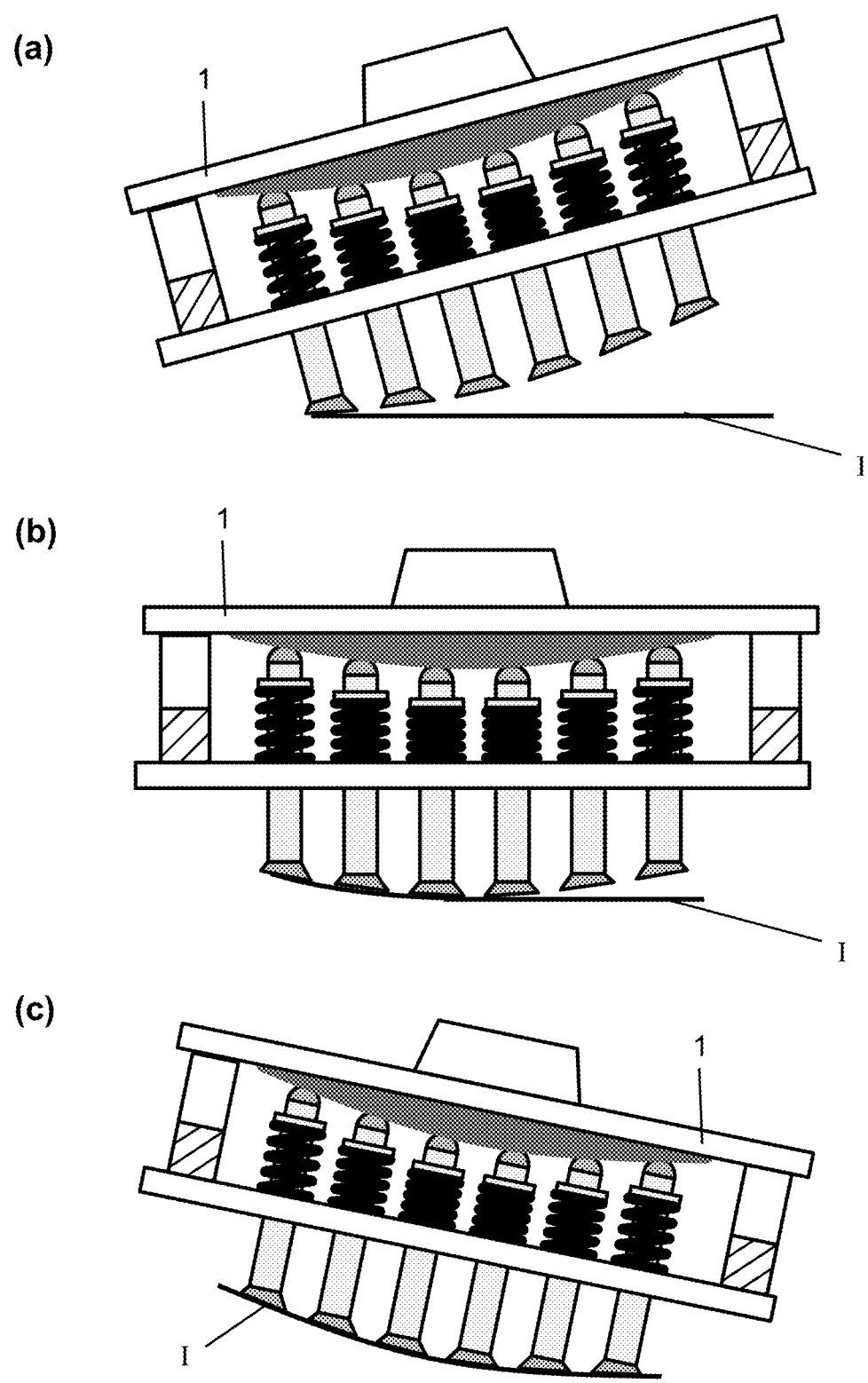
Figure 4:
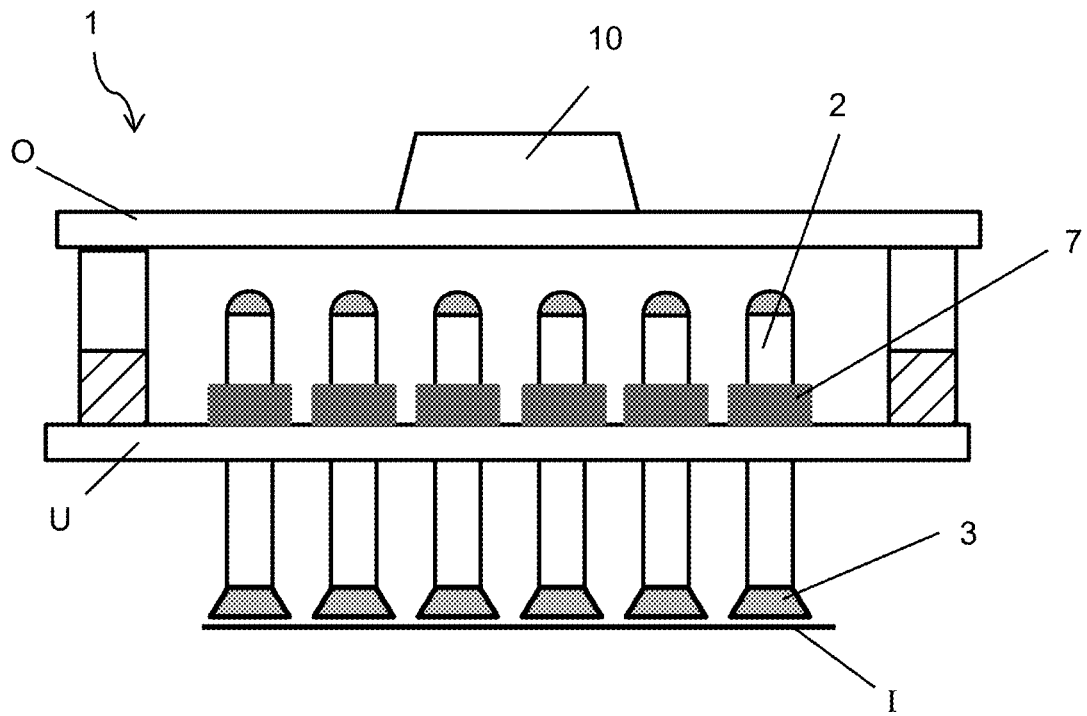
Figure 5:
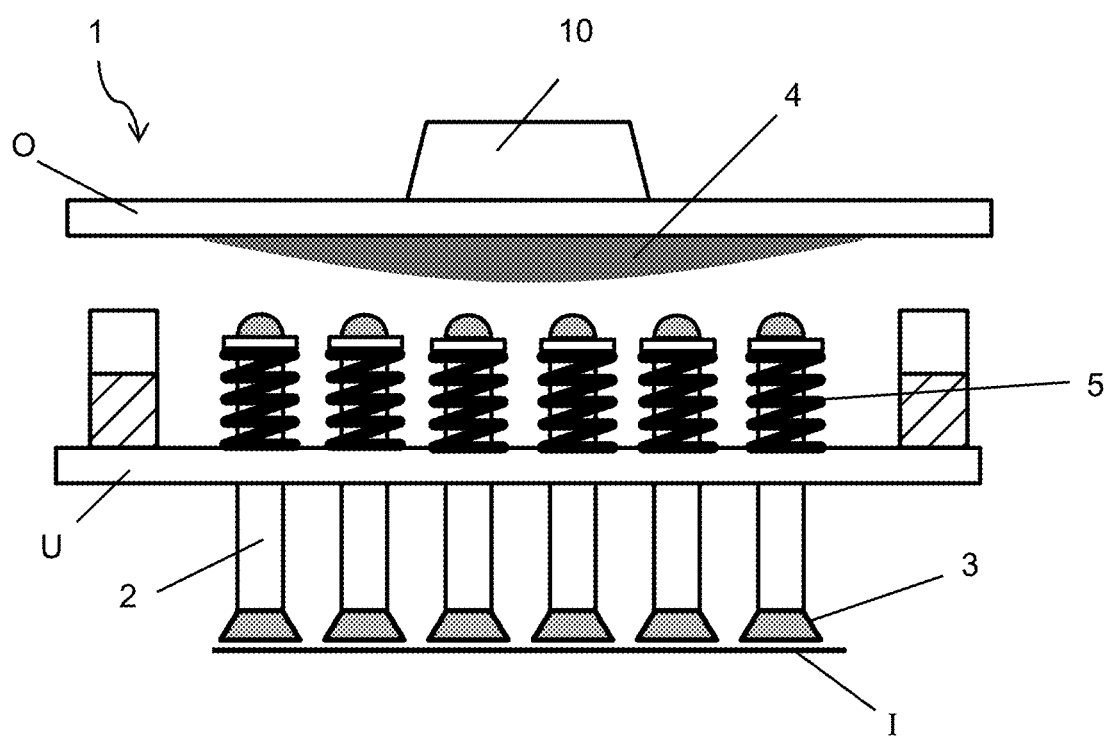

The invention is explained in detail with reference to drawings and exemplary embodiments. The drawings are schematic representations and are not true to scale. The drawings in no way restrict the invention. They depict:

FIG. 1 a side view of an embodiment of the device according to the invention, FIG. 2 a side view of another embodiment of the device according to the invention, FIG. 3 a device according to the invention in an embodiment of the method according to the invention, FIG. 4 a side view of another embodiment of the device according to the invention, FIG. 5 the device of FIG. 1 in the opened state, FIG. 6 a device according to the invention in another embodiment of the method according to the invention, FIG. 7 a prior art layer stack for producing a composite pane, FIG. 8 a layer stack in accordance with the method according to the invention, FIG. 9 an exemplary embodiment of the method according to the invention with reference to a flowchart, and FIG. 10 another exemplary embodiment of the method according to the invention with reference to a flowchart.

FIG. 1 depicts a first variant of a first embodiment of a device according to the invention for picking up, shaping, and placing a thin glass pane. The device comprises a frame 1 with an upper side O and a lower side U. The upper side O of the frame 1 is connected to a robot arm 10, by means of which the frame 1 is movable. The lower side U of the frame 1 is equipped with picking up pins 2 that are guided through boreholes in the cover of the lower side U. Situated in the interior of the frame is a spring 5 associated with each picking up pin 2, which is clamped between the covering of the frame 1 and a collar on the picking up pin and presses the picking up pin upward into the frame 1. A model mold 4 is attached to the upper side O of the frame 1. The model mold 4 is, for example, a hollow mold made of steel with a downward facing surface whose curvature corresponds to the intended curvature of a glass pane I that is to be picked up and shaped by the device. The picking up pins 2 contact the model mold 4 via ball rollers 9 and are pressed downward by the model mold 4 against the spring force, more or less far depending on their position. Since the picking up pins 2 are all substantially the same length, the ends of the picking up pins 2 directed toward the glass pane span an area whose curvature corresponds to the curvature of the model mold 4. The glass pane adhering via suction cups 3 to the picking up pins 2 is bent into the intended shape. The glass pane 1 is made, for example, of chemically tempered aluminosilicate glass with a thickness of only 0.7 mm. The glass pane I, planar in the initial state, can be shaped elastically by the device according to the invention, far below its softening temperature, due to its low thickness.

The upper side O and the lower side U can be moved apart from one another in order to open the frame 1 and to exchange the model mold 4. Thus, the same device can be used with different model molds 4 for different types of glass panes.

FIG. 2 depicts a second variant of the first embodiment of the device according to the invention. Here again, the intended deflection of the picking up pins 2 is achieved by a model mold 4, which is, however, implemented here as a glass pane. The glass pane is made, for example, of 2-mm-thick soda lime glass and is pre-bent conventionally in the mold corresponds to the intended shape of the thin glass pane I. The model mold 4 is clamped between the picking up pins 2 and complementary retaining pins 6. The retaining pins 6 are attached to the upper side O of the frame 1 and also equipped with springs 5, whose spring force opposes that of the picking up pins 2 such that the model mold 4 is securely fixed. Associated with each picking up pin 2 is, preferably, exactly one retaining pin 6, which is arranged oppositely positioned such that the model mold 4 is exposed to no shear forces, which could result in breakage of the glass pane used as model mold 4.

The frame has side openings 8, through which the model mold 4 can be removed and exchanged. Thus, the same device can be used for different glass pane types.

FIG. 3 depicts the device of FIG. 1 during the picking up of the thin glass pane I in a first embodiment of the method according to the invention. The picking up pins 2 are already brought into their final position at the start by means of the model mold 1, with the suction cups 3 spanning a curved surface that corresponds to the intended shape of the glass pane I. The frame 1 is inclined such that with the lowering of the frame 1, initially, only the picking up pins 2 with the least distance from one side edge of the glass pane I come into contact with the glass pane I (FIG. 3a). The robot arm 10 then executes a rotational movement such that, in a rolling movement of the frame 1, additional picking up pins 2 come into contact with the glass pane I, with the already adhering regions of the glass pane I being raised and shaped in the process (FIG. 3b). At the end of the rolling movement, the frame 1 is inclined in the opposite direction and all suction cups adhere to the glass pane I, which is bent thereby into the intended shape (FIG. 3c).

FIG. 4 depicts a second embodiment of the device according to the invention. The movement of the picking up pins 2 occurs here not with the use of a model mold 4, but by means of motors 1 that are mounted on the lower side U of the frame 1. Here, as well, the picking up pins 2 can already be moved into their final position at the start, and the glass pane I can subsequently be picked up according to the first embodiment of FIG. 3 with a rolling movement. Alternatively, however, the glass pane I can also be picked up, as presented according to a second embodiment of the method: here, at the start, the suction cups 3 span a planar surface and are brought into contact with the glass pane I. The glass pane I can then be raised and bent into the intended shape by subsequent movement of the picking up pins 2.

FIG. 5 depicts the device of FIG. 1 in the opened state. The upper part O of the frame 1 is spaced farther from the lower side U such that the picking up pins 2 have no contact with the model mold 4. They are, consequently, situated in the undeflected starting position and the suction cups 3 span a planar surface, with which the planar glass pane I can be picked up.

FIG. 6 depicts the device of FIG. 5 after the raising of the glass pane I in the second embodiment of the method according to the invention. The glass pane I has been picked up by the opened device (FIG. 6a). Subsequently, the device is closed by bringing the upper part O and and the lower part U as close to one another as possible. The picking up pins 2 are pressed downward through contact with the model mold 4 as a function of position such that the adhering glass pane I is shaped.

FIG. 7 demonstrates the difficulties in the prior art arranging of a layer stack comprising a planar thin glass pane I and a pre-bent thicker second glass pane II having an interposed thermoplastic intermediate layer III. The second glass pane II is, for example, a 2.1-mm-thick pane of soda lime glass that was conventionally pre-bent into the final shape above its softening temperature, for example, by press bending. The thermoplastic intermediate layer III is, for example, a 0.76-mm-thick PVB film, that was congruently trimmed-to-size and was placed covering the surface on the second glass pane II. The thin glass pane I is, for example, an only 0.55-mm-thick, chemically tempered pane of aluminosilicate glass that is sufficiently flexible to enable dispensing with conventional pre-bending. Instead, the glass pane I can be adapted to the shape of the at ambient temperature by pressure; and the layer stack can, for example, subsequently be laminated to form a composite glass.

The two glass panes I and II are approx. congruent both in the planar initial state and also in the bent final state, wherein the glass panes can have a slightly different size in the initial state in order to compensate for shifting of the side edges relative to one another caused systematically by the bending. However, since the second glass pane II is pre-bent, its projection area P-II is reduced compared to the projection area P-I of the first glass pane I. Thus, the two glass panes I and II cannot be arranged on one another with the necessary precision such that the side edges are frequently not perfectly flush in the final state and such that great disparity in terms of flushness appears within one production series.

FIG. 8 demonstrates, in contrast, the advantage of the present invention. Since the device according to the invention not only raises the thin glass pane I and places it on the layer stack, but also bends it into the final shape already before placing it, the two projection areas P-I, P-II of the glass panes I, II are equal. Consequently, they can be aligned on one another with greater precision, for example, using automation, by means of mechanical sensor devices or by means of optical position measurements. The flushness of the side edges is significantly improved.

FIG. 9 and FIG. 10 depict examples of two embodiments of the method according to the invention with reference to a flowchart.

LIST OF REFERENCE CHARACTERS (I) thin glass pane
(II) second, thicker glass pane
(III) thermoplastic film
(1) frame
(2) picking up pin
(3) suction cup
(4) model mold
(5) spring
(6) retaining pin
(7) motor
(8) side opening of the frame 1
(9) ball roller
(10) robot arm
(U) lower side of the frame 1
(O) upper side of the frame 1
P-I projection of the thin glass pane I
P-II projection of the second glass pane II

The invention claimed is:

1. A device for picking up, shaping, and placing a thin glass pane, comprising a frame with an upper side and a lower side, which is suitable to be directed onto a glass pane with a thickness of less than 1 mm and which is provided with a plurality of picking up pins that are arranged parallel to one another and whose end directed onto the glass pane is equipped with a suction cup, wherein the lower side has a full-surface cover that is provided with passages that extend throughout the full-surface cover and through which the picking up pins extend and are guided, wherein the picking up pins are movable along their direction of extension through said passages independent of one another, wherein each picking up pin is movable out and into the frame via said passages, in order to adapt an arrangement of the suction cups to an intended shape of the glass pane, and wherein the picking up pins are provided with springs and the ends of the picking up pins facing away from the glass pane are in contact with a model mold, as a result of which the picking up pins are held against the spring force of the springs.

2. The device according to claim 1, wherein the model mold is attached to the upper side of the frame.

3. The device according to claim 1, wherein the upper side and the lower side of the frame are movable relative to one another, as a result of which the frame can be opened to change the model mold.

4. The device according to claim 1, wherein the picking up pins are provided with motors, by means of which the picking up pins can be moved along their direction of extension.

5. The device according to claim 1, wherein all the picking up pins have substantially a same length and a shape of the model mold substantially corresponds to the intended shape of the glass pane.

6. The device according to claim 1, wherein the frame is attached to a robot arm.

7. The device according to claim 1, wherein the model mold is a pane that is held between the picking up pins and a plurality of retaining pins equipped with springs arranged on the upper side of the frame.

8. The device according to claim 7, wherein the frame has a side opening, through which the model mold can be removed.

9. A method for picking up, shaping, and placing a thin glass pane, the method comprising:
providing a device for picking up, shaping, and placing the thin glass pane, comprising a frame with an upper side and a lower side, which is suitable to be directed onto the glass pane with a thickness of less than 1 mm and which is provided with a plurality of picking up pins that are arranged parallel to one another and whose end directed onto the glass pane is equipped with a suction cup, wherein the lower side has a full-surface cover that is provided with passages that extend throughout the full-surface cover and through which the picking up pins extend and are guided,
wherein the picking up pins are movable along their direction of extension through said passages independent of one another, wherein each picking up pin is movable out and into the frame via said passages, in order to adapt an arrangement of the suction cups to an intended shape of the glass pane, and
wherein the picking up pins are provided with springs and the ends of the picking up pins facing away from the glass pane are in contact with a model mold, as a result of which the picking up pins are held against the spring force of the springs;
bringing into contact the glass pane with the suction cups, and
raising the glass pane, wherein the picking up pins are moved such that the arrangement of the suction cups is adapted to an intended shape of the glass pane in order to shape the glass pane.

10. The method according to claim 9, wherein the glass pane is first picked up with the suction cups and the picking up pins are subsequently moved, wherein the glass pane is shaped.

11. The method according to claim 9, wherein the picking up pins are first moved such that the arrangement of the suction cups is adapted to the intended shape of the glass pane, and wherein the glass pane is subsequently picked up with the suction cups with a rolling movement, wherein the glass pane is shaped.

12. The method according to claim 9, wherein the glass pane is placed on a thermoplastic film that is arranged on a second glass pane with a thickness of at least 1.5 mm.

13. The method according to claim 12, wherein the second glass pane is subsequently spot heated in order to melt the thermoplastic film locally, as a result of which the glass pane and the second glass pane adhere locally to the thermoplastic film.

14. The method according to claim 9, wherein, at the time of placing, the glass pane is separated from the suction cups by means of compressed air.

* * * * *